United States Patent
Kumagai (10) Patent No.: US 10,521,160 B2
(45) Date of Patent: Dec. 31, 2019

(54) IMAGE FORMING APPARATUS AND PRINT SETTING METHOD

(71) Applicant: CANON KABUSHIKI KAISHA, Tokyo (JP)

(72) Inventor: Takekazu Kumagai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/148,900

(22) Filed: Oct. 1, 2018

(65) Prior Publication Data

US 2019/0107978 A1 Apr. 11, 2019

(30) Foreign Application Priority Data

Oct. 5, 2017 (JP) .................................. 2017-195486

(51) Int. Cl.
*G06F 3/12* (2006.01)
*G06K 15/00* (2006.01)

(52) U.S. Cl.
CPC .......... *G06F 3/1205* (2013.01); *G06F 3/1257* (2013.01)

(58) Field of Classification Search
None
See application file for complete search history.

(56) References Cited

U.S. PATENT DOCUMENTS

| 2006/0209329 A1 | 9/2006 | Akiyama |
| 2008/0074508 A1* | 3/2008 | Shiohara ............ H04N 1/00427 348/222.1 |
| 2008/0297839 A1 | 12/2008 | Kayama |
| 2010/0214571 A1 | 8/2010 | Luo |
| 2018/0084140 A1* | 3/2018 | Yagiura .............. H04N 1/32112 |

FOREIGN PATENT DOCUMENTS

JP 2003-167697 A 6/2003

OTHER PUBLICATIONS

Hara Shinichiro et al., Print Indication Device, Jun. 13, 2003 (2003), WIPO, pp. 1-2 (Machine translation of JP 2003167697 Print Indication Device) (Year: 2003).*

* cited by examiner

*Primary Examiner* — Dov Popovici (74) *Attorney, Agent, or Firm* — Canon U.S.A., Inc. I.P. Division (57) ABSTRACT

If files selected from files of multiple types, which are stored in a storage unit, have the same extension, a print setting screen having setting items corresponding to the extension is displayed. If the extensions of the selected files include two or more types of extensions, a print setting screen having predetermined setting items is displayed, regardless of the extensions.

17 Claims, 12 Drawing Sheets

|  | PDF | XPS | TIFF | JPEG | MULTIPLE FILE TYPES |
|---|---|---|---|---|---|
| NUMBER OF COPIES | AVAILABLE | AVAILABLE | AVAILABLE | AVAILABLE | AVAILABLE |
| COLOR SETTING | AVAILABLE | AVAILABLE | AVAILABLE | AVAILABLE | AVAILABLE |
| SHEET SELECTION | AVAILABLE | AVAILABLE | AVAILABLE | AVAILABLE | AVAILABLE |
| FINISHING | AVAILABLE | AVAILABLE | UNAVAILABLE | UNAVAILABLE | UNAVAILABLE |
| DUPLEX PRINTING | AVAILABLE | AVAILABLE | AVAILABLE | AVAILABLE | AVAILABLE |
| RANGE SPECIFICATION | AVAILABLE | AVAILABLE | AVAILABLE | UNAVAILABLE | UNAVAILABLE |

FIG. 12

|  | PDF | XPS | TIFF | JPEG |
|---|---|---|---|---|
| RESOLUTION | AVAILABLE | AVAILABLE | UNAVAILABLE | UNAVAILABLE |
| HALFTONE | AVAILABLE | AVAILABLE | AVAILABLE | AVAILABLE |
| FIT TO SHEET SIZE | AVAILABLE | AVAILABLE | UNAVAILABLE | UNAVAILABLE |
| ENLARGEMENT/ REDUCTION | UNAVAILABLE | UNAVAILABLE | AVAILABLE | AVAILABLE |
| EXPAND PRINTING AREA | AVAILABLE | AVAILABLE | AVAILABLE | AVAILABLE |
| N-UP PRINTING | AVAILABLE | AVAILABLE | UNAVAILABLE | UNAVAILABLE |
| BOOKBINDING | AVAILABLE | AVAILABLE | UNAVAILABLE | UNAVAILABLE |
| PRINT COMMENT | AVAILABLE | UNAVAILABLE | UNAVAILABLE | UNAVAILABLE |
| PASSWORD TO OPEN DOCUMENT | AVAILABLE | UNAVAILABLE | UNAVAILABLE | UNAVAILABLE |
| ORIENTATION OF IMAGE | UNAVAILABLE | UNAVAILABLE | AVAILABLE | AVAILABLE |
| PRINT START POSITION | UNAVAILABLE | UNAVAILABLE | AVAILABLE | AVAILABLE |

IMAGE FORMING APPARATUS AND PRINT SETTING METHOD

BACKGROUND OF THE INVENTION

Field of the Invention

The present disclosure relates to a print setting method in an image forming apparatus.

Description of the Related Art

Technologies to display a screen on which print settings are made for files to be printed, which are stored in personal computers (PCs), are proposed. The files to be printed are hereinafter referred to as print target files.

Japanese Patent Laid-Open No. 2003-167697 discloses a technology to display a print setting screen corresponding to the type of a file. For example, different print setup items are capable of being set for files of file extensions ".txt" and ".bmp". Different print setting screens for the respective file extensions are displayed and the print settings are changed on the respective screens.

In the technology disclosed in Japanese Patent Laid-Open No. 2003-167697, the number of operation steps in a print setting process is small when one file is selected as the print target file while it is necessary to make the print settings for files of multiple types when the files of multiple types are selected as the print target files. Accordingly, the number of the operation steps is increased when the files of multiple types are selected as the print target files and the print setting process is made complicated.

SUMMARY OF THE INVENTION

The present invention provides an image forming apparatus comprising a processor, a display unit, and a storage unit capable of storing multiple types of files having different file extensions, wherein the processor executes a program to perform: displaying the files of multiple types stored in the storage unit on the display unit; selecting one or more files from the displayed files of multiple types as print targets; displaying, if the one or more files selected as the print targets have the same extension, a screen having multiple setting items corresponding to the extension on the display unit as a print setting screen; displaying, if the extensions of the multiple files selected as the print targets include two or more types of extensions, a screen having predetermined setting items on the display unit as the print setting screen, regardless of the two or more types of extensions; and controlling to print out the selected one or more files based on print settings set on the print setting screen.

Further features of the present invention will become apparent from the following description of embodiments (with reference to the attached drawings).

DESCRIPTION OF THE EMBODIMENTS

Embodiments of the present disclosure will herein be described in detail with reference to the drawings. The embodiments described below are not intended to limit the present disclosure according to the claims and all the combinations of features described. in the embodiments are not necessarily required for the solution of the present disclosure.

First Embodiment

Figure 1:
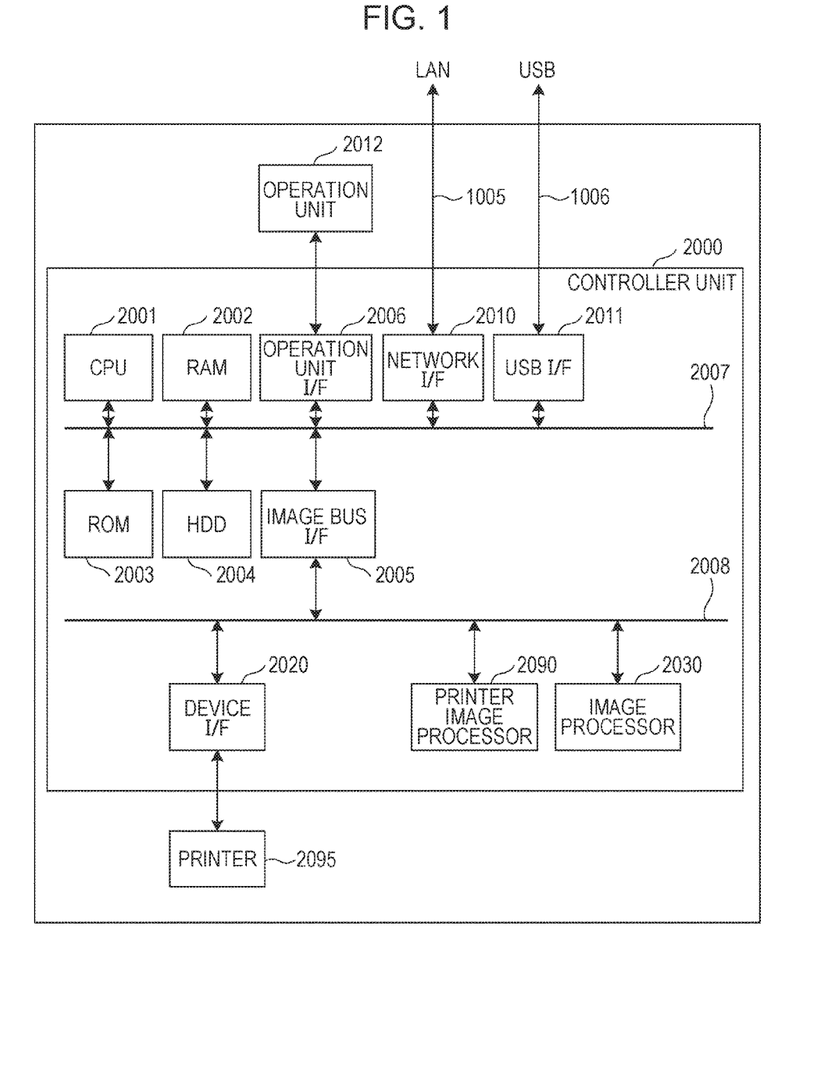
FIG. 1 is a block diagram illustrating a hardware configuration of an image forming apparatus according to a first embodiment of the present disclosure.

FIG. 1 is a block diagram illustrating a hardware configuration of an image forming apparatus according to a first embodiment.

Referring to FIG. 1, a controller unit 2000 is connected to a printer 2095, which is an image output device. The controller unit 2000 provides a print function to print out a file stored in a hard disk drive (HDD) 2004 (storage unit) with the printer 2095. The controller unit 2000 also provides a function to print a file stored in a universal serial bus (USB) storage device with the printer 2095 via a USB 1006. The USB storage device is, for example, a USB memory or a USB HDD. The controller unit 2000 connects to a local area network (LAN) 1005 to perform control for inputting and outputting image information and device information. The controller unit 2000 further provides a network print function to print out a file stored in a storage connected to the controller unit 2000 via the LAN 1005 with the printer 2095.

The controller unit 2000 includes a central processing unit (CPU) 2001 and a read only memory (ROM) 2003. The CPU 2001 boots an operating system (OS) using a boot program stored in the ROM 2003. Then, the CPU 2001 executes an application program stored in the HDD 2004 on the OS to perform various processes. A random access memory (RAM) 2002 is used as a working area of the CPU 2001. The RAM 2002 provides an image memory area for temporarily storing image data, in addition to the working area. The HDD 2004 stores the image data with the application program. The CPU 2001 is connected to the ROM 2003 and the RAM 2002 via a system bus 2007.

The CPU 2001 is connected to an operation unit interface (I/F) 2006 and an image bus interface (I/F) 2005. The CPU 2001 is further connected to a network interface (I/F) 2010 and a USB interface (I/F) 2011.

The operation unit I/F 2006 is an interface with an operation unit 2012 including a touch panel and hard keys and supplies image data to be displayed in the operation unit 2012 to the operation unit 2012. The operation unit I/F 2006 transmits information input by a user with the operation unit 2012 to the CPU 2001. The network I/F 2010 is connected to the LAN 1005 and performs input and output of information with each apparatus on the LAN 1005 via the LAN 1005. The USB I/F 2011 is connected to the USB 1006 and performs input and output of files with the USB storage device via the USB 1006.

The image bus I/F 2005 is a bus bridge that connects the system bus 2007 to an image bus 2008 that transfers image data at a high speed to convert the data structure. The image bus 2008 is composed of a peripheral component Interconnect (PCI) bus or an IEEE 1394. A device interface (I/F) 2020 is connected to the image bus 2008 and the printer 2095 is connected to the device I/F 2020. The device I/F 2020 performs transmission and reception of data with the printer 2095. A printer image processor 2090 performs, for example, correction and resolution conversion to print-out image data. An image processor 2030 performs a process of rotating image data, a process of converting multi-valued image data into Joint Photographic Experts Group (JPEG) data, a process of compressing binary image data into data, such as Joint Bi-level Image Experts Group (JBIG) data, Modified Modified Read (MMR) data, or Modified Huffman (MH) data, and a process of decompressing the data.

Figure 2:
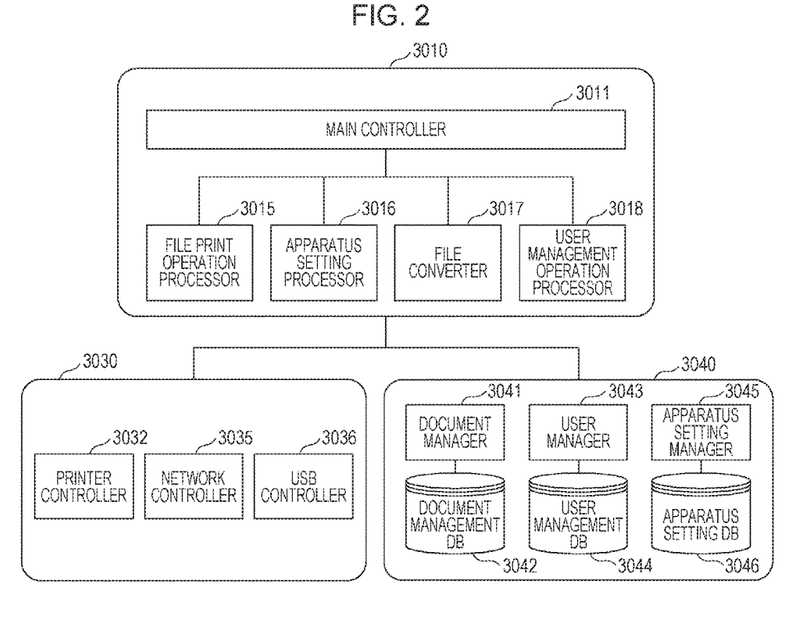
FIG. 2 is a block diagram illustrating a software configuration for describing the main portions of software components operating on the image forming apparatus according to the first embodiment of the present disclosure.

FIG. 2 is a block diagram illustrating a software configuration for describing the main portions of software components operating on the image forming apparatus according to the first embodiment.

The program configuration is composed of an operation unit application 3010, a device control unit 3030, and a data management unit 3040. The operation unit application 3010 performs processing corresponding to an operation by the user with the operation unit 2012. The device control unit 3030 controls the printer 2095 provided in the image forming apparatus. The data management unit 3040 manages the image data and so on stored in the HDD 2004.

The operation unit application 3010 includes a main controller 3011, a file print operation processor 3015, an apparatus setting processor 3016, a file converter 3017, and a user management operation processor 3018. The main controller 3011 controls basic input and output operations, such as display of a screen, an operation by the user with the touch panel, and an operation by the user with the hard keys. The file print operation processor 3015 performs, for example, display and printout of electronic image data stored in the USB storage device connected to the HDD 2004 or the USB 1006 using a document manager 3041 and the device control unit 3030. The apparatus setting processor 3016 processes operations to refer to and change the settings of the apparatus.

The file converter 3017 performs a process of converting an image file into a portable document format (PDF) file or an extensible markup language (XML) paper specification (XPS) file and the reverse file conversion process. The image file is, for example, a JPEG file, an MH file, an MMR file, a JBIG file, or a Tagged Image File Format (TIFF) file. The user management operation processor 3018 controls an operation, such as a change operation.

The device control unit 3030 includes a printer controller 3032 that controls the printer 2095, a network controller 3035 that controls network communication, and a USB controller 3036 that controls USB communication.

The document manager 3041 performs, for example, processes of creating, changing, deleting, and referring to a document composed of a file of image data or the like, processes of creating, changing, deleting, and referring to a folder in which documents are stored, a process of changing attribute information about a document or a folder, a process of changing an access permission setting of a document or a folder, and a process of temporarily storing a document. These pieces of information are managed in a document management database (DB) 3042.

The user manager 3043 performs, for example, processes of creating, deleting, referring to, and changing a user identifier (ID), a user name, a user password, a mail address of the user, a home folder of the user, and so on. The user manager 3043 also performs an authentication process of the user in response to a request from each unit in the apparatus. These pieces of information are managed in a user management database (DB) 3044. An apparatus setting manager 3045 manages settings necessary to operate the apparatus. The setting information about the apparatus is managed in an apparatus setting database (DB) 3046.

Figure 3:
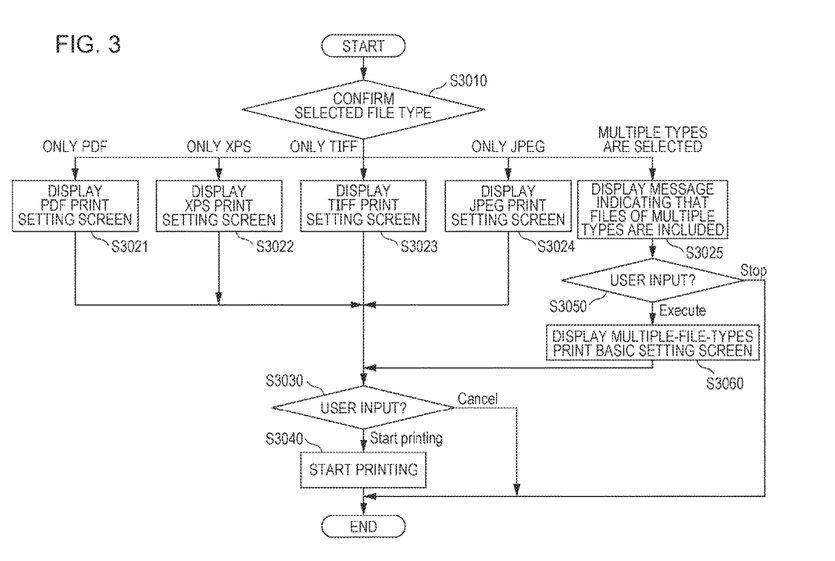
FIG. 3 is a flowchart for describing a process to display a print setting screen in the image forming apparatus according to the first embodiment.

FIG. 3 is a flowchart for describing a print setting process performed with the file print function in the first embodiment. The flowchart in FIG. 3 is realized by decomposing a control program stored in the ROM 2003 in the RAM 2002 and executing the control program by the CPU 2001.

Figure 4:
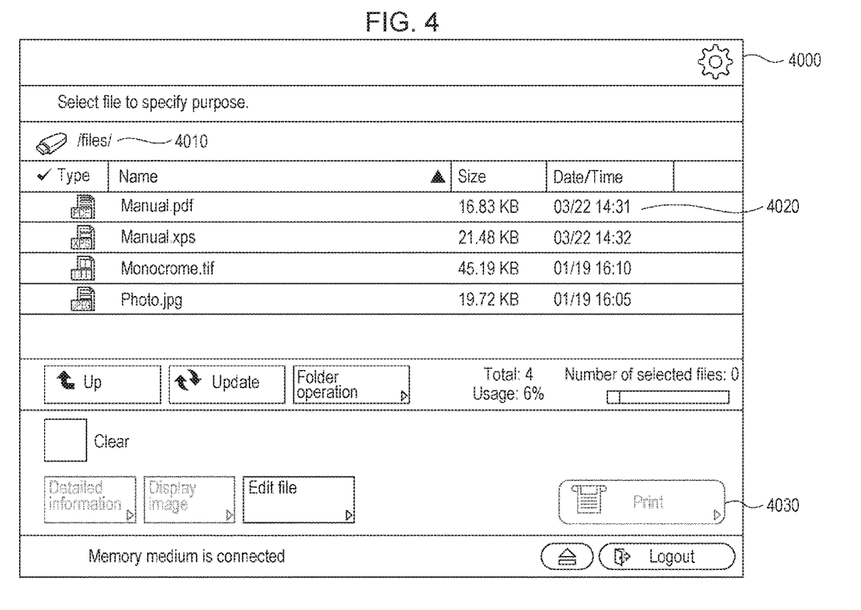
FIG. 4 illustrates an example of a file list screen displayed in an operation unit in the first embodiment.

On a file list screen 4000 in FIG. 4, which is displayed in the operation unit 2012, upon pressing of a Print button 4030 by the user, a print setting request is transmitted to the controller unit 2000.

Upon reception of the print setting request from the operation unit 2012 by the CPU 2001, the process in the flowchart in FIG. 3 is started.

FIG. 4 illustrates an example of the file list screen 4000. Referring to FIG. 4, "/files/" is displayed in a current folder display portion 4010, which indicates that a folder for which the file list is displayed is a "/files" folder. Four files: "Manual.pdf", "Manual.xps", "Monochrome.tif", and "Photo.jpg" are displayed in a file list display portion 4020. A state in which no file is selected is indicated in the example in FIG. 4. Although the list of files in the USB storage device connected to the USB 1006 is displayed in the file list display portion 4020 in the first embodiment, a list of files stored in the HDD 2004 or a storage connected via the LAN 1005 may be displayed in the file list display portion 4020. The HDD 2004 is capable of storing multiple types of files having different file extensions. Upon pressing of a file name in the list of files, a row on which the file name is displayed is highlighted to change the display so as to indicate that the file is in a selected state. Multiple files are capable of being selected here. Upon pressing a file name in the selected state, the highlighting is canceled to return the display to a non-selected state. In the example in FIG. 4, the Print button 4030 is shaded to indicate that the Print button 4030 is unavailable. If at least one file is in the selected state, the shading of the Print button 4030 is cleared and the Print button 4030 becomes available. The print setting request at least includes the number of files to be printed, the name of each file to be printed, and the file type.

Referring to FIG. 3, in Step S3010, the file type of the print target file included in the print setting request and the number of file types selected from the file list screen 4000 in FIG. 4 (the number of file extensions that are selected) are confirmed and, then, the process is branched based on the result of the confirmation. If the selected file type is one type and a PDF file is selected, the process goes to Step S3021. If the selected file type is one type and an XPS file is selected, the process goes to Step S3022. If the selected file type is one type and a TIFF file is selected, the process goes to Step S3023. If the selected file type is one type and a JPEG file is selected, the process goes to Step S3024. If multiple files types (file extensions of two or more types) are selected, the process goes to Step S3025. Only the branches to PDF, XPS, TIFF, and JPEG are indicated here in order to describe examples of the file types capable of being printed with a printing apparatus. However, the file types capable of being printed with the printing apparatus is not limited and the number of branches may be varied depending on the capacity of the printing apparatus.

Figure 11:
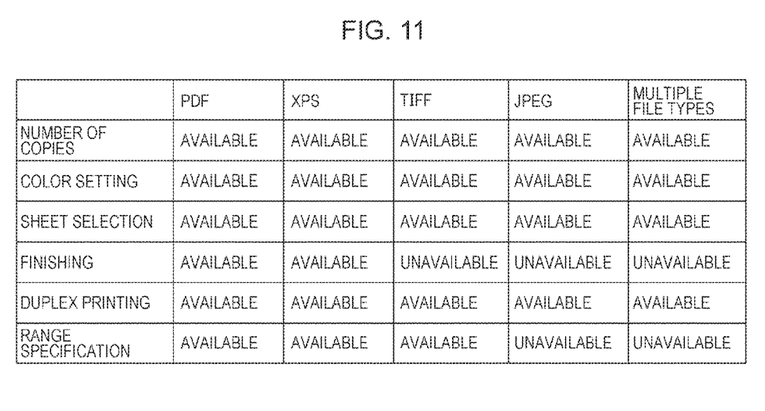
FIG. 11 is a table illustrating print basic setting items of each file type in the first embodiment.

In Step S3021, a print setting screen corresponding to PDF is displayed. The PDF print setting screen includes two kinds of setting screens. One of the two kinds of setting screens is a PDF print basic setting screen 5000 illustrated in FIG. 5 and the other of the two kinds of setting screens is a PDF print detailed setting screen 6000 illustrated in FIG. 6. The PDF print basic setting screen 5000 is created with reference to a PDF row of print basic setting items illustrated in FIG. 11. Referring to FIG. 11, "AVAILABLE" indicates an item that is capable of being set and "UNAVAILABLE" indicates an item that is not capable of being set.

Figure 5:
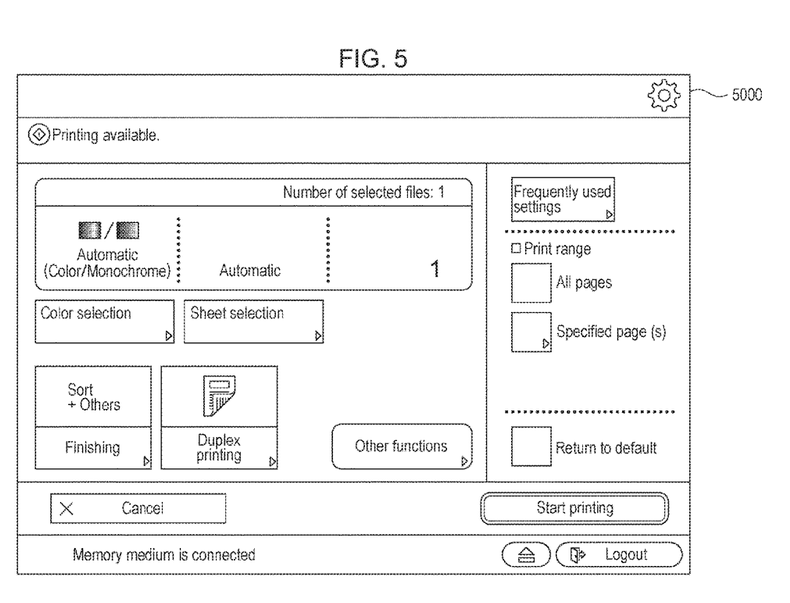
FIG. 5 illustrates a PDF print basic setting screen displayed in the operation unit in the first embodiment.

In the first embodiment, Number of copies, Color setting, Sheet selection, Finishing, Duplex printing, and Range specification are capable of being set as the print basic setting items for a PDF file. Although PDF, XPS, TIFF, and JPEG are indicated as the individual file types, the number of file types may be varied depending on the capacity of the printing apparatus. Since all the items are available in PDF, a screen on which all the items are capable of being set is created and displayed. On the PDF print basic setting screen 5000, pressing each setting item button enables the setting of the setting item to be changed.

Figure 6:
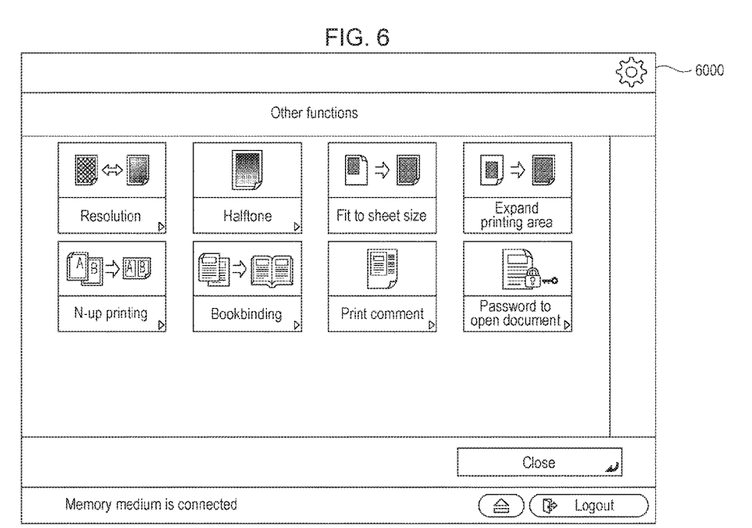
FIG. 6 illustrates a PDF print detailed setting screen displayed in the operation unit in the first embodiment.
Figure 12:
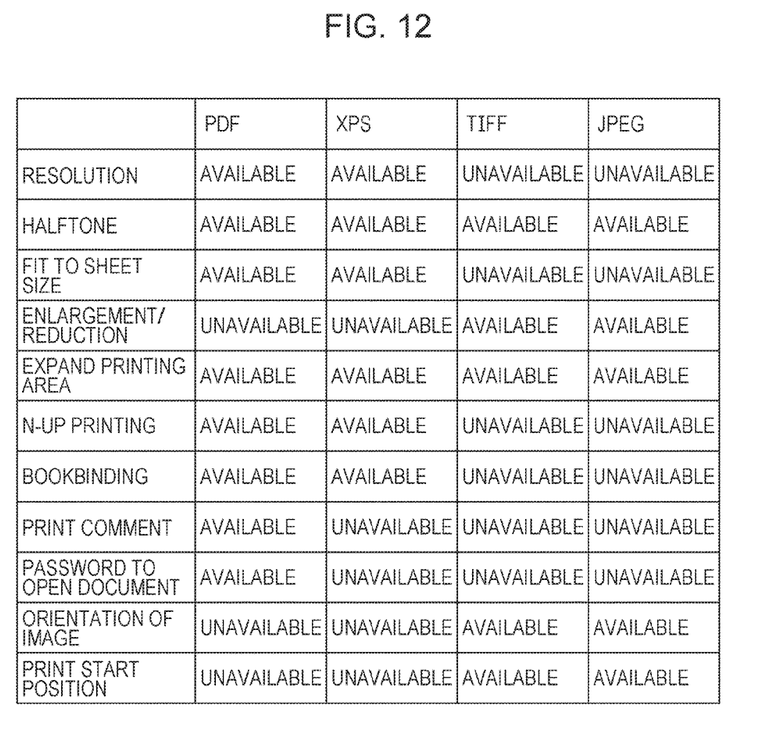
FIG. 12 a table illustrating print detailed setting items of each file type in the first embodiment.

The PDF print detailed setting screen 6000 is displayed upon pressing of an Other functions button on the PDF print basic setting screen 5000. The PDF print detailed setting screen 6000 is created with reference to a PDF row of print detailed setting items illustrated in FIG. 12. Referring to FIG. 12, "AVAILABLE" indicates an item that is capable of being set and "UNAVAILABLE" indicates an item that is not capable of being set.

In the first embodiment, Resolution, Halftone, Fit to sheet size, Enlargement/Reduction, Expand printing area, N-up printing, Bookbinding, Print comment, Password to open document. Orientation of image, and Print start position are set as the print detailed setting items. The number of items may be varied depending on the capacity of the printing apparatus. Although PDF, XPS, TIFF, and JPEG are indicated as the file types, the number of file types may be varied depending on the capacity of the printing apparatus. Since the available items in the PDF row are Resolution, Halftone, Fit to sheet size, Expand printing area, N-up printing, Bookbinding, Print comment, and Password to open document, a screen on which these items are capable of being set is created and displayed. Pressing each setting item button enables the setting of the setting item to be changed. Upon pressing of a Close button, the PDF print basic setting screen 5000 is displayed.

In Step S3022, an XPS print basic setting screen and an XPS print detailed setting screen, which are XPS print setting screens, are displayed. These screens are not particularly illustrated. The processing method in Step S3022 is the same as in Step S3021 and Step S3022 differs from Step S3021 in that an XPS row, instead of the PDF row, of the print basic setting items in FIG. 11 and the print detailed setting items in FIG. 12 is referred to.

Figure 7:
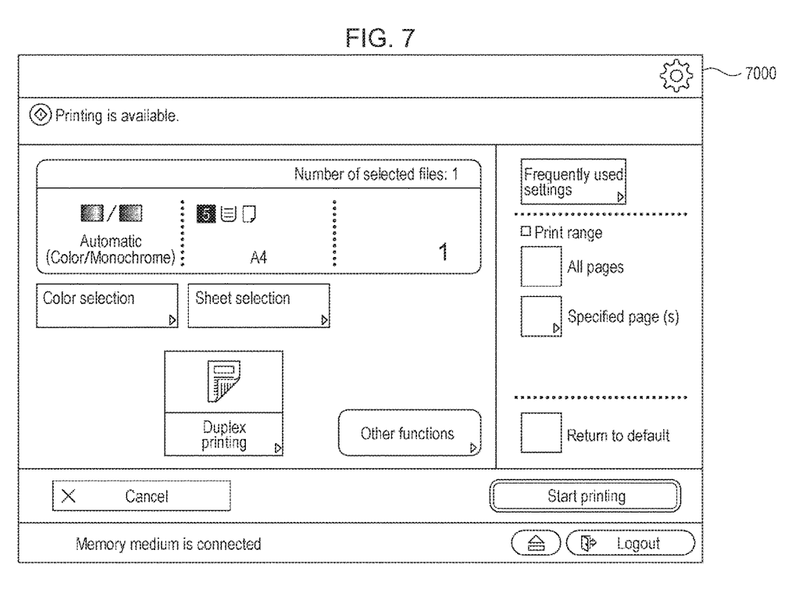
FIG. 7 illustrates a TIFF print basic setting screen displayed in the operation unit in the first embodiment.
Figure 8:
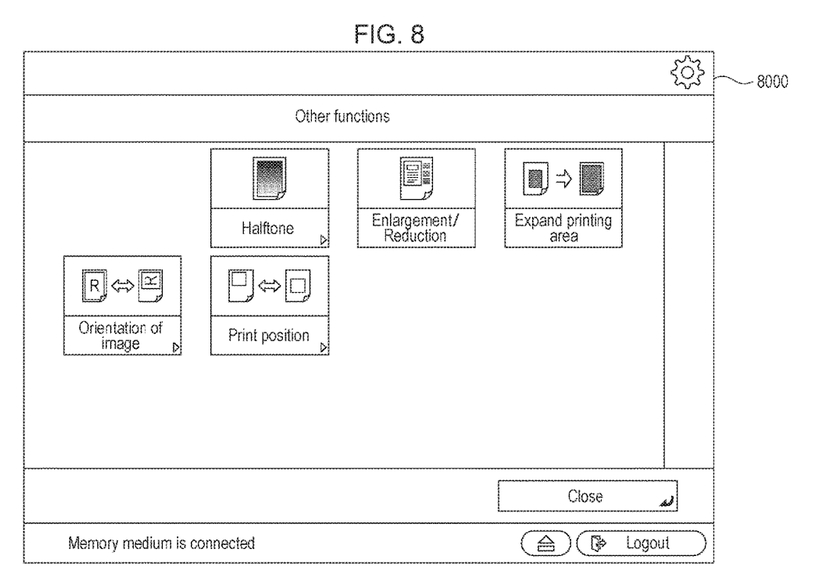
FIG. 8 illustrates a TIFF print detailed setting screen displayed in the operation unit in the first embodiment.

In Step S3023, a TIFF print basic setting screen 7000 in FIG. 7 and a TIFF print detailed setting screen 8000 in FIG. 8, which are TIFF print setting screens, are displayed. The processing method in Step S3023 is the same as in Step S3021 and Step S3023 differs from Step S3021 in that a TIFF row, instead of the PDF row, of the print basic setting items in FIG. 11 and the print detailed setting items in FIG. 12 is referred to.

In Step S3024, a JPEG print basic setting screen and a JPEG print detailed setting screen, which are JPEG print setting screens, are displayed. These screens are not particularly illustrated. The processing method in Step S3024 is the same as in Step S3021 and Step S3024 differs from Step S3021 in that a JPEG row, instead of the PDF row, of the print basic setting items in FIG. 11 and the print detailed setting items in FIG. 12 is referred to.

Figure 10:
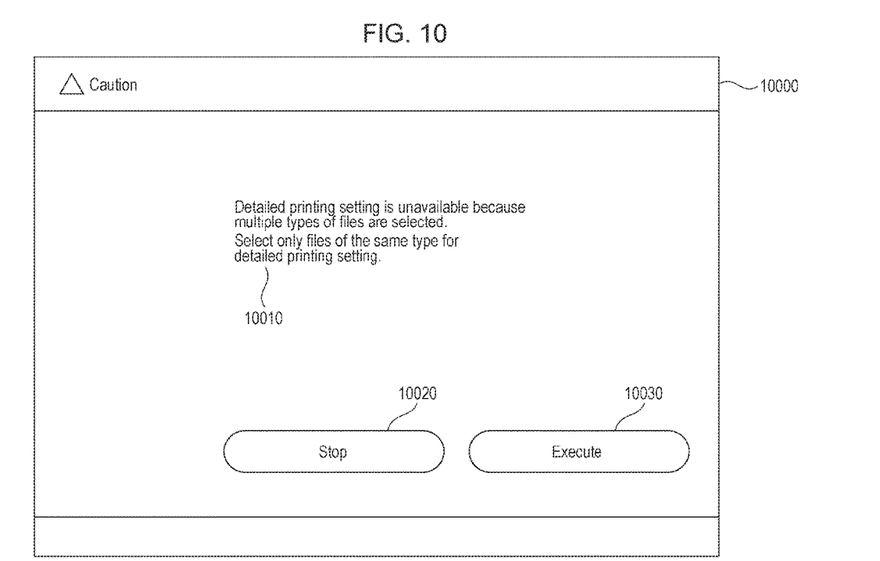
FIG. 10 illustrates a screen indicating a message displayed in the operation unit in the first embodiment.

In Step S3025, a screen 10000 in FIG. 10 is displayed in the operation unit 2012. A message 10010 indicating that "Detailed printing setting is unavailable because tiles of multiple types are selected.", a Stop button 10020, and an Execute button 10030 are arranged on the screen 10000. When the user wants to make detailed settings by displaying a screen, a prompt not to select files of multiple types may be displayed.

In Step S3030, the process is branched based on which button, a Start printing button or a Cancel button, is pressed on each print basic setting screen. If the Start printing button is pressed, the process goes to Step S3040. In Step S3040, a the selected on the file list screen is printed out using the print settings set on the relevant print basic setting screen and the relevant print detailed setting screen. If the Cancel button is pressed, the process illustrated in FIG. 3 is terminated and the file list screen 4000 is displayed again. In Step S3050, the process is branched based on which button, the Stop button 10020 or the Execute button 10030, is pressed on the screen 10000. If the Stop button 10020 is pressed, the process illustrated in FIG. 3 is terminated and the file list screen 4000 is displayed again. If the Execute button 10030 is pressed, the process goes to Step S3060.

Figure 9:
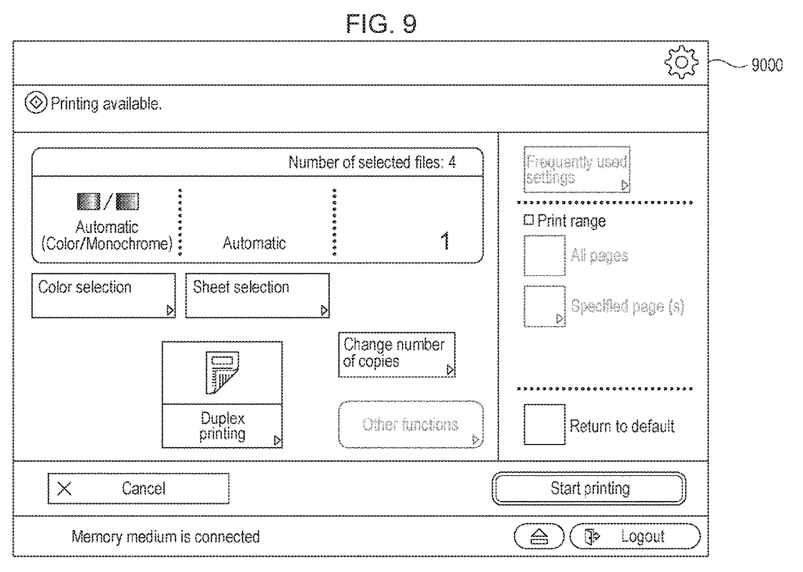
FIG. 9 illustrates a multiple-file-types print basic setting screen displayed in the operation unit in the first embodiment.

In Step S3060, a print setting screen (a multiple-tile-types print basic setting screen 9000 in FIG. 9) when multiple tile types exist (files of extensions of two or more types are selected) is displayed. The multiple-file-types print basic setting screen 9000 in FIG. 9 is a predetermined screen based on the print basic setting items in FIG. 11, regardless of the selected multiple tile extensions.

The display steps in Steps S3021, S3022, S3023, S3024, and S3060 are performed by the CPU 2001 that performs a display control process to display the print setting screen in the operation unit 2012. The processing method in Step S3060 is the same as that in Step S3021 and Step S3060 differs from Step S3021 in that a Multiple file types row in the print basic setting items in FIG. 11 is referred to and in that no print detailed setting screen is created. In the Multiple file types row, only the print setup items that are effective in all the file types of PDF, XPS, TIFF, and JPEG and that are applicable to all the file types are made available.

The Other functions button on the multiple-file-types print basic setting screen is shaded to disable the print detailed setting. Disabling the print detailed setting in the above manner when the files of multiple types exist enables the files of multiple types to be printed out with one operation without changing the existing user-friendliness. In addition, since the items that are capable of being set when the multiple file types exist are limited to the items that are capable of being set in all the file formats, the print settings that are set are reliably reflected in printouts.

Second Embodiment in the first embodiment, when multiple file types exist in the print target files, the print setting screen is created and displayed in Step S3060 based on the information in which "Available" and "Unavailable" of the print setup items in the Multiple file types row n FIG. 11 are fixed. In contrast, instead of the use of the information in which "Available" and "Unavailable" of the print setup items in the Multiple file types row in FIG. 11 are fixed, it may be determined whether "Available" or "Unavailable" is set for each print setup item based on the combination of the selected file types.

For example, when the selected file types are PDF and XPS, the PDF row and the XPS row in FIG. 11 are referred to and a print setting screen is created and displayed, on which Number of copies, Color setting, Sheet selection, Finishing, Duplex printing, and Range specification, which are "Available" in both the rows, are capable of being set. When the selected file types are PDF and JPEG, the PDF row and the JPEG row in FIG. 11 are referred to and a print setting screen is created and displayed, on which Number of copies, Color setting, Sheet selection, and Duplex printing, which are "Available in both the rows, are capable of being set.

As described above, it is possible to provide the more flexible print setting screens.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2017-195486, filed on Oct. 5, 2017, which is hereby incorporated by reference herein in its entirety.

What is claimed is:

1. An image for apparatus comprising:
   a processor;
   a display unit; and
   a storage unit capable of storing a plurality of types of files having different file extensions,
   wherein the processor executes a program to perform:
   displaying the files of a plurality of types stored in the storage unit on the display unit;
   selecting one or more files from the displayed files of a plurality of types as print targets;
   displaying, if the files selected as the print targets have the same extension, a screen having a plurality of setting items corresponding to the extension on the display unit as a print setting screen;
   displaying, if the extensions of the plurality of files selected as the print targets include two or more types of extensions, a screen having predetermined setting items on the display unit as the print setting screen, regardless of the two or more types of extensions; and
   controlling to print out the selected one or more files based on print settings set on the print setting screen.

2. The image forming apparatus according to claim 1, wherein, if the extensions of the plurality of files selected as the print targets include two or more types of extensions, the processor executes the program to further perform displaying a message indicating that setting of detailed items is disabled on the display unit.

3. The image forming apparatus according to claim 1, wherein the predetermined setting items are those setting items that are applicable to all the plurality of extensions that are capable of being stored in the storage unit.

4. The image forming apparatus according to claim 1, wherein the predetermined setting items are setting items that are applicable to all the plurality of extensions corresponding to the plurality of files selected as the print targets.

5. The image forming apparatus according to claim 1, wherein the extensions of the files capable of being stored in the storage unit are at least two extensions, among PDF, XPS, TIFF, and JPEG.

6. A print setting method in an image forming apparatus including a storage unit capable of storing a plurality of types of files having different file extensions, the print setting method comprising:
   displaying the files of a plurality of types stored in the storage unit on a display unit of the image forming apparatus;
   selecting one or more files from the displayed files of a plurality of types as print targets;
   displaying, if the one or more files selected as the print targets have the same extension, a screen having a plurality of setting items corresponding to the extension on the display unit as a print setting screen;
   displaying, if the extensions of the plurality of files selected as the print targets include two or more types of extensions, a screen having predetermined setting items on the display unit as the print setting screen, regardless of the two or more types of extensions; and printing out the selected one or more files based on print settings set on the print setting screen.

7. The print setting method according to claim 6, wherein, if the extensions of the plurality of files selected as the print targets include two or more types of extensions, the method further comprises displaying on the display unit a message indicating that setting of detailed items is disabled.

8. The print setting method according to claim 6, wherein the predetermined setting items are setting items that are applicable to all the plurality of extensions that are capable of being stored in the storage unit.

9. The print setting method according to claim 6, wherein the predetermined setting items are setting items that are applicable to all the plurality of extensions corresponding to the plurality of files selected as the print targets.

10. The print setting method according to claim 6, wherein the extensions of the files capable of being stored in the storage unit are at least two extensions, among PDF, XPS, TIFF, and JPEG.

11. A non-transitory computer-readable storage medium storing a program to cause a computer to perform a print setting method in an image forming apparatus including a storage unit capable of storing a plurality of types of files having different file extensions, the print setting method comprising:
 displaying the files of a plurality of types stored in the storage unit on a display unit of the image forming apparatus;
 selecting one or more files from the displayed files of a plurality of types as print targets;
 displaying, if the one or more files selected as the print targets have the same extension, a screen having a plurality of setting items corresponding to the extension on the display unit as a print setting screen;
 displaying, if the extensions of the plurality of files selected as the print targets include two or more types of extensions, a screen having predetermined setting items on the display unit as the print setting screen, regardless of the two or more types of extensions; and
 printing out the selected one or more files based on print settings set on the print setting screen.

12. The non-transitory computer-readable storage medium according to claim 11,
 wherein, if the extensions of the plurality of files selected as the print targets include two or more types of extensions, the method further comprises displaying on the display unit a message indicating that setting of detailed items is disabled.

13. The non-transitory computer-readable storage medium according to claim 11,
 wherein the predetermined setting items are setting items that are applicable to all the plurality of extensions that are capable of being stored in the storage unit.

14. The non-transitory computer-readable storage medium according to claim 11,
 wherein the predetermined setting items are setting items that are applicable to all the plurality of extensions corresponding to the plurality of files selected as the print targets.

15. The non-transitory computer-readable storage medium according to claim 11,
 wherein the extensions of the files capable of being stored in the storage unit are at least two extensions, among PDF, XPS, TIFF, and JPEG.

16. An image forming apparatus comprising:
 a processor;
 a display unit; and
 a universal serial bus (USB) interface,
 wherein the processor executes a program to perform:
 displaying a plurality of types of files configured to have different file extensions and to be stored in a USB storage device connectable via the USB interface on the display unit;
 selecting one or more files from the displayed files of a plurality of types as print targets;
 displaying, if the files selected as the print targets have the same extension, a screen having a plurality of setting items corresponding to the extension on the display unit as a print setting screen;
 displaying, if the extensions of the plurality of files selected as the print targets include two or more types of extensions, a screen having predetermined setting items on the display unit as the print setting screen, regardless of the two or more types of extensions; and
 controlling to print out the selected one or more files based on print settings set on the print setting screen.

17. An image forming apparatus comprising:
 a processor;
 a display unit; and
 a network interface,
 wherein the processor executes a program to perform:
 displaying a plurality of types of files configured to have different file extensions and to be stored in an external storage device connectable via the network interface on the display unit;
 selecting one or more files from the displayed files of a plurality of types as print targets;
 displaying, if the files selected as the print targets have the same extension, a screen having a plurality of setting items corresponding to the extension on the display unit as a print setting screen;
 displaying, if the extensions of the plurality of files selected as the print targets include two or more types of extensions, a screen having predetermined setting items on the display unit as the print setting screen, regardless of the two or more types of extensions; and
 controlling to print out the selected one or more files based on print settings set on the print setting screen.

\* \* \* \* \*